April 19, 1955
S. V. PALLADINO, JR
2,706,754
FLUID LEVEL SIGNAL
Filed July 13, 1951
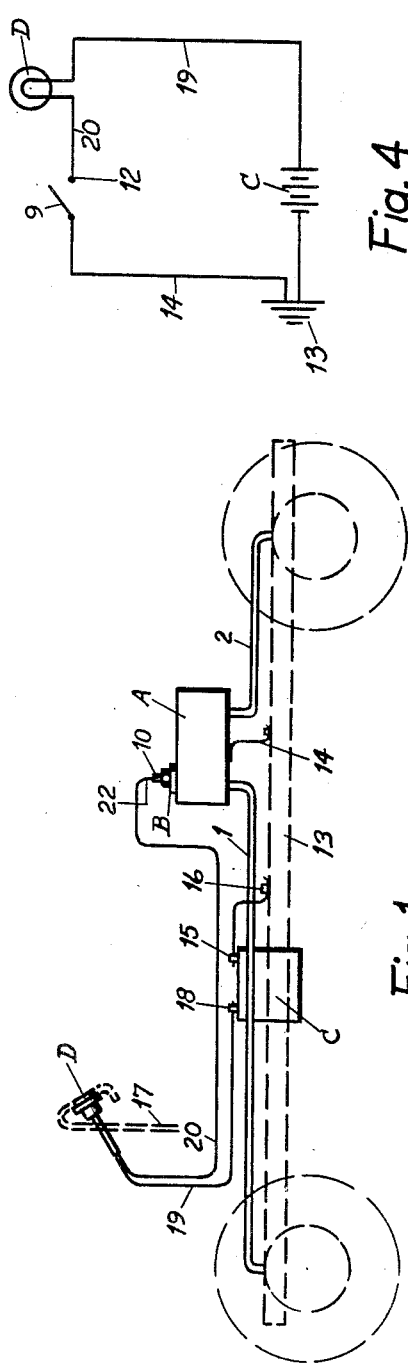
INVENTOR.
Steve V Palladino, Jr.
BY
William H Patterson
Attorney

2,706,754

FLUID LEVEL SIGNAL

Steve V. Palladino, Jr., Bradenton, Fla.

Application July 13, 1951, Serial No. 236,624

1 Claim. (Cl. 200—84)

This invention relates to a fluid level signal, but more particularly and specifically to a signal used in combination with the hydraulic brake system of an automobile or other vehicle. Although the invention is illustrated and described in its use with the hydraulic brake system of a vehicle, it is to be understood that the invention is not limited to this specific use in that it could be used to signal the level in the fuel tank of a vehicle; the level of liquid in an electric battery; the oil level in an engine crankcase; or in fact the fluid or liquid level in any reservoir or container.

Reference herein to a signal is to be understood to include a visual signal, such as an electric light, or an audible signal such as a buzzer or warning bell.

A signal to indicate to a motorist that the fluid level in the master cylinder reservoir of the fluid brake system of his vehicle is below the proper level is of great importance in that one of the greatest dangers of hydraulic brakes is fluid loss, which when it occurs will permit air to enter the brake system, which can result in serious or fatal accidents due to failure of brakes.

The primary object of the invention is the provision of a signal which is positive of operation to warn the vehicle driver that the fluid in the vehicle hydraulic brake system is below the safe level.

Another object of the invention is the provision of a signal of the character described which is comparatively cheap of installation; simple of construction and operation so that breakdown or failure is a remote possibility; and a construction and arrangement which can be installed quickly and easily on vehicles already manufactured in use.

Another object of the invention is the provision of a signal of the character and for the purpose described which is electrical in nature and which is designed to operate properly on a moving vehicle where the fluid is in motion.

Another object of the invention is the provision of a signal of the character described which conveniently provides for its removal so that fluid can be added to the reservoir.

Other objects, advantages, and novel features of construction of the invention will appear in the following description when read in the light of the accompanying drawings.

In the drawings:

Figure 1 is an illustration of the invention as applied to a vehicle, the major portions of the vehicle being illustrated in dotted line.

Figure 2 is a vertical sectional view through the master cylinder reservoir illustrating the position the signal parts assume when fluid is below a predetermined or proper level.

Figure 3 is a view similar to Figure 2, the signal parts, however, being illustrated in the positions they assume when there is adequate fluid in the reservoir.

Figure 4 illustrates the electric circuit utilized in the invention.

Having reference now to the drawings and utilizing like reference numerals and characters to designate similar parts, A is the master cylinder reservoir of the hydraulic brake system and from it extend the conduits 1 and 2 to the front and rear brakes of the vehicle. These conduits are ordinarily flexible in nature.

All master cylinder reservoirs are provided with a filler cap and in the present invention the particular filler cap provided by the manufacturer for his reservoir is utilized and is designated B.

The signal of the present invention embodies an electric circuit which is opened and closed by the movement of a float disposed in the reservoir and which is positioned in accordance with the level of the fluid therein. When the fluid level is sufficiently high the electric circuit is open, as illustrated in Figure 4, and when fluid is below the predetermined or safe level the electric circuit is closed, and under these conditions the float is in the position illustrated in Figure 1 of the drawings.

This switch which operates the signal is carried by the reservoir cap B and is disposed within the reservoir but removable therefrom when the reservoir cap is removed.

Specifically the switch embodies an elongated metallic tube 3 the upper end of which is suitably secured to the cap as at 4 and extends downwardly into the reservoir and has an outwardly turned lower end 5. This tube constitutes a guide along which the float 6 can slide in response to the level of the fluid 7 in the reservoir. The float is provided with a metallic bushing or ferrule 8 which contacts the outer face of the tube 3 and at the under side of the float is provided with a collar 9.

An electric wire 10 provided with a suitable covering or insulation 11 extends throughout the length of the tube 3. At its lower end this wire is bare and is bent up as at 12 for contact with the float collar 9 when the fluid level is low and permits the float to descend so that its collar 9 can contact the wire end 12.

The chassis 13 of the vehicle has grounded to it the master cylinder reservoir A as designated at 14 and one terminal 15 of an electric battery C is also grounded to the chassis as at 16. The vehicle dash is schematically illustrated at 17 and on it is mounted a suitable electrically operated signal D. The remaining terminal 18 of the battery is connected to the signal by a current conductor or wire 19 while a second conductor 20 extends from the signal and is secured to the upper bare end 21 of the aforementioned wire 10.

Although it is not so illustrated, for convenience the end 22 of the conductor 20 would be provided with any well known clip type connector so that it can be rapidly and conveniently connected to or disconnected from the wire 10 to facilitate removal and replacement of the filler cap B.

Specific description of Figure 3 of the drawings is unnecessary in view of the description thus far given, as this figure of the drawings merely illustrates the position of the float when there is adequate fluid in the master cylinder reservoir. Under the conditions illustrated in Figure 3, the electric circuit is open as it is illustrated in Figure 4.

It is to be noted that should the fluid go below the predetermined safe level the attention of the driver will be brought to this fact and his notice will be particularly attracted because due to road shock and fluid movement the signal if visual will have a flashing effect due to repeated opening and closing of the electric circuit and if the signal is audible it will be reoccurrent for the same reason.

From the foregoing description it will be seen that a highly efficient, comparatively simple and cheap and easily installed signal is provided for indicating the fluid level in the brake system and bringing the attention of the motorist to the necessity of replenishing the fluid should the same need replenishing.

Departures from the specific construction illustrated and described can be made without departing from the inventive concept, and the invention is to be limited therefore only by the scope of the hereinafter appended claim.

What I claim is:

In a vehicle having a hydraulic brake system, a metallic current conducting master fluid reservoir having fluid therein, said reservoir being provided with a removable current conductive filler cap in electrical contact with said reservoir, a concentric tubular conductor extending through said cap into said reservoir including an outer hollow metallic guide in electrical contact with said cap, a portion of the innermost end of said tubular conductor being turned outwardly to extend at right angles to the main portion thereof, a tubular insulating sheathing within said guide and extending for a spaced distance beyond the ends thereof, a conductor wire within said sheathing and extending beyond the ends thereof, the end of said conductor wire within the reservoir being turned outwardly through said right angular end portion of said tubular conductor and upwardly within the reservoir beyond the extended out-turned end of said tubular conductor, a float carried by a central tubular metallic sleeve, said float valve sleeve having telescopic sliding electrical engagement with said tubular guide within said reservoir, said float sleeve being turned outwardly to form a collar beneath the float electrically contactable with the upturned end of said conductor wire, said float being movable vertically along the guide in response to changes in the fluid level within the reservoir, a source of electric current supply having one terminal connection to a ground, the fluid reservoir being electrically connected to the same ground, and the other terminal of the current supply source being connected to that end of the conductor wire where it extends above the reservoir cap.

References Cited in the file of this patent

UNITED STATES PATENTS

| | | |
|---|---|---|
| 106,141 | Duryea | Aug. 9, 1870 |
| 460,895 | Smith | Oct. 6, 1891 |
| 2,161,441 | Vickers | June 6, 1939 |
| 2,494,802 | Fox | Jan. 17, 1950 |